July 4, 1933.   T. M. RAGAN   1,916,284
COUPLING
Filed March 7, 1931   2 Sheets-Sheet 1
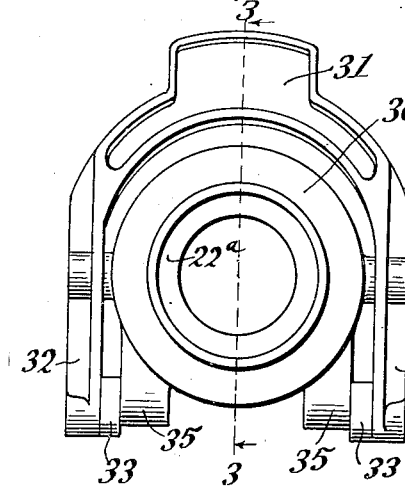
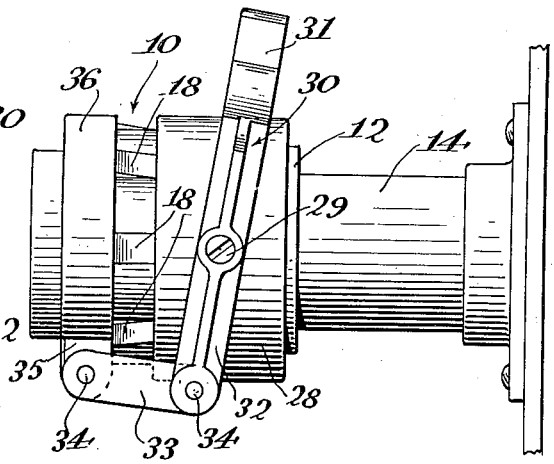
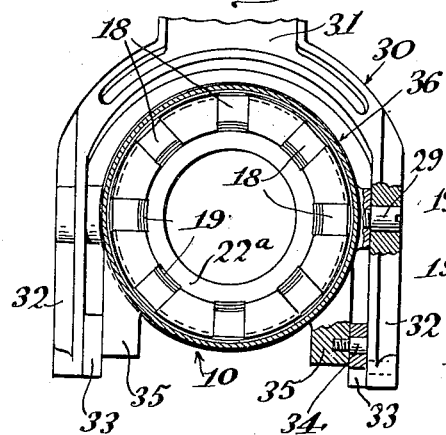
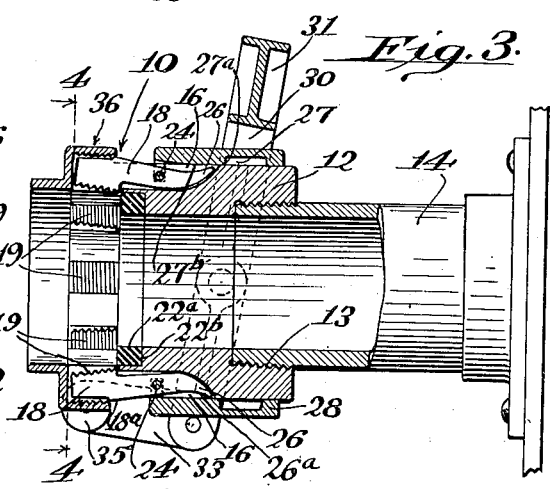
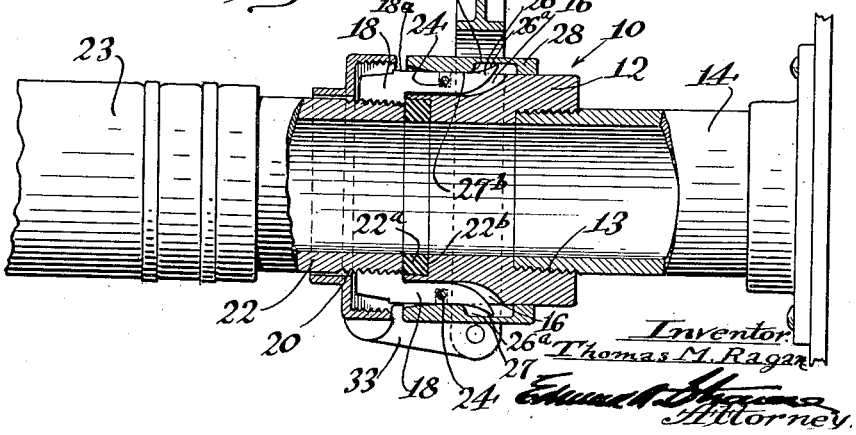
Inventor:
Thomas M. Ragan

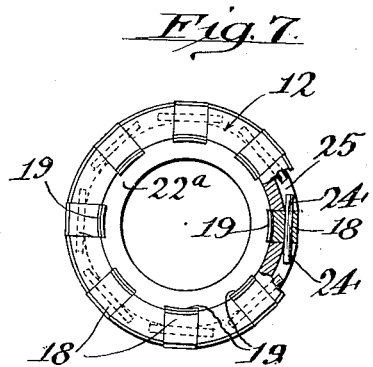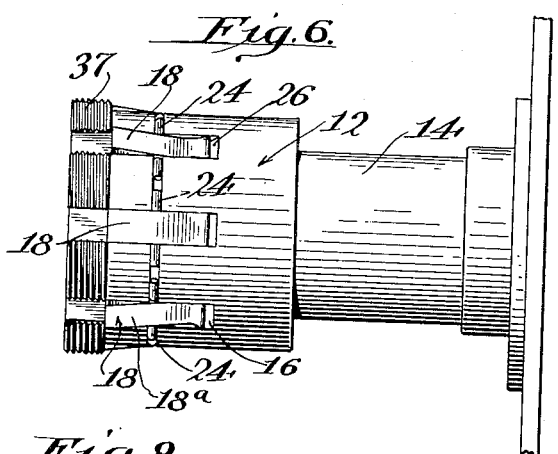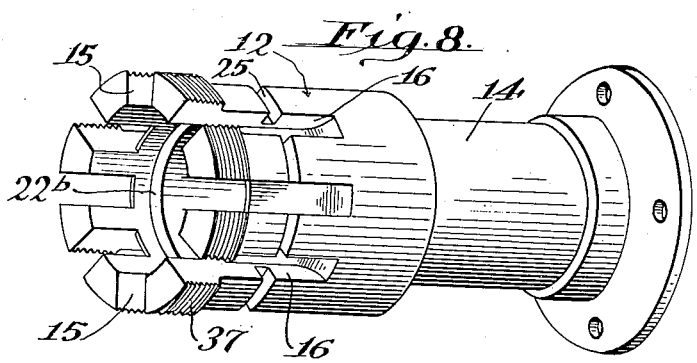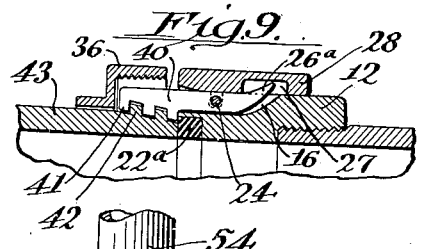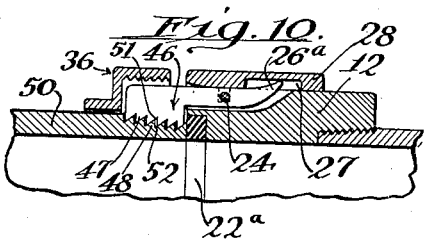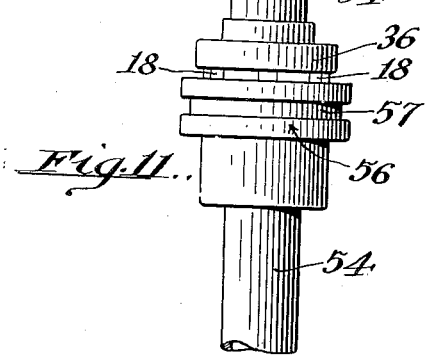

Patented July 4, 1933

1,916,284

UNITED STATES PATENT OFFICE

THOMAS M. RAGAN, OF LOS ANGELES, CALIFORNIA, ASSIGNOR TO EARL B. WIGGINS, OF LOS ANGELES, CALIFORNIA

COUPLING

Application filed March 7, 1931. Serial No. 520,879.

This invention relates to hose or pipe couplings, more specifically to quick detachable couplings whereby two conduits may be connected without rotary movement therebetween.

The object of this invention is to provide a coupling of the character referred to constructed in such a manner that a fluid tight connection may be quickly effected between two conduits without the employment of wrenches or the like.

Another object of the present invention is to provide a coupling so constructed that two conduits may be connected or separated thereby without turning one in relation to the other.

Other objects and advantages will be apparent from the following description, reference being had to the accompanying drawings, in which—

Fig. 1 is a side elevation of the body member of the coupling connected to a relatively stationary pipe or conduit.

Fig. 2 is a front elevation of the coupling.

Fig. 3 is a longitudinal section taken on line 3—3 of Fig. 2.

Fig. 4 is a section taken on line 4—4 of Fig. 3 in the direction indicated by the arrows.

Fig. 5 is a longitudinal section taken through the coupling showing two conduits connected together thereby.

Fig. 6 is a side elevation of the body portion of the coupling with the jaw actuating sleeve removed.

Fig. 7 is a front elevation of the body portion, parts being broken away and shown in section.

Fig. 8 is a perspective view of the body portion with the jaws removed.

Fig. 9 is a fragmentary sectional view of a modified form of locking means.

Fig. 10 is a view similar to Fig. 9 showing another form of jaw locking means.

Fig. 11 is a side elevation of the coupling adapted to be used for rotary well drill pipe or the like.

Referring more specifically to the drawings, 10 generally designates the coupling which consists of a body portion 12 which is internally threaded, as indicated at 13, for connection with a relatively stationary pipe or conduit 14.

Formed in the side wall of the body portion and extending inwardly from its front face is a plurality of openings 15 which communicate with elongated recesses 16, in which are disposed a corresponding number of jaws designated at 18. Each of said jaws have screw threads or the like 19 formed on their inner faces which are adapted to engage the external threads 20 of a male or complemental coupling member designated at 22.

The coupling member 22 may be connected to a pipe, hose or conduit designated at 23, the end face of said member is adapted to engage a gasket 22$^a$ mounted in a counter bore 22$^b$ formed in the body member when the two members are connected together, as shown in Fig. 5.

Jaws 18 are provided with pivot pins 24 and have cams 26 formed on one end thereof, the pins resting in grooves 25 formed in the body portion, the grooves extend between and communicate with the recesses 16.

Slidably mounted on the body portion is a sleeve 28 having an internal recess 27 formed therein, the sleeve being connected to a yoke 30 provided with an operating handle 31, the yoke arms 32 being connected by pins 29 to the sleeve 28 and by links 33 and pins 34 to lugs 35 formed on an annulus 36. The annulus is internally threaded for engagement with screw threads 37 formed on said body portion, and serves to guide the male member into engagement with the gasket 22$^a$.

Sleeve 28 serves to actuate the jaws so that the screw threaded portion thereon may be moved into or out of engagement with the threads on the coupling member 22, and is adapted to be operated by pulling or pushing on the handle of the yoke. The jaws being opened during rearward movement of the sleeve 28 by the edge 27$^a$ of the recess 27 engaging the upper face 26$^a$ of the cams 26, and closed during forward movement of the sleeve by contact of the internal face 27$^b$ of the sleeve with the upper face 18$^a$ of the jaws.

From the foregoing it will be seen that the jaws may be opened as shown in Fig. 3, or closed as shown in Fig. 5 by shifting the sleeve on the body member.

Connection between the two members is effected by pulling forwardly on the yoke, the action of which brings the threaded portion of the jaws into engagement with the threads on the male member as above described.

It being particularly noted that due to the pivotal mounting of the jaws, the male member will be drawn firmly into engagement with the washer 22ª, and retained in such engagement by the internal face 27ᵇ of said sleeve engaging the surfaces 18ª of the jaws, also that all strain on the pivot pins 24 is relieved when the members are connected.

Referring to Fig. 9, 40 designates a slightly modified form of jaw having a plurality of tongues 41 substantially square shaped in cross section formed thereon which are adapted to mesh with tongues 42 formed on a male member 43 when the two members are connected together.

Referring to Fig. 10, 46 designates a further modified form of jaw, the jaw having teeth 47 formed thereon adapted to mesh with teeth 48 formed on the male member designated at 50. The teeth on the jaws having angular faces 51 which engage faces 52 formed on the male member and draw it into engagement with the washer when the two members are connected together.

Referring to Fig. 11, the coupling shown is adapted to be employed as tool joints of rotary well drill pipe or the like designated at 54. The coupling being constructed in exactly the same manner as that shown in Figs. 1 to 8, except that the yoke is omitted, and the sleeve designated at 56 is provided with an annular groove 57 adapted to receive a suitable tool for actuating the same.

I claim:

1. A coupling comprising a cylindrical body member having a plurality of openings extending inwardly from its front face and communicating with elongated recesses formed in the external face of the side wall thereof, a pivoted jaw mounted in the recess formed in said body member, each jaw having teeth formed on its inner face adjacent one end and cam portions on the opposite end thereof, a sleeve having an internal recess formed therein slidably mounted on said body member, and means for actuating said sleeve, said jaws being held in closed position by engagement of the internal face of said sleeve with the outer faces of the jaws in open position by engagement with the cams.

2. A coupling comprising a cylindrical body member having a plurality of elongated recesses formed in its side wall, a jaw mounted in each of the recesses formed in said body member, each jaw having teeth formed on its inner face adjacent one end thereof and provided with oppositely disposed pivot pins resting in grooves formed in the body member, a sleeve slidably mounted on said body member, a yoke having an operating handle connected to said sleeve, and means connecting said yoke to said body member.

3. A coupling comprising a cylindrical tubular body portion having a plurality of elongated recesses formed in its side wall communicating with openings extending inwardly from its front face and crosswise grooves extending between and communicating with said recesses, an annulus mounted on said body portion, each jaw having a set of teeth formed on its inner face adjacent one end and a cam portion formed on its opposite end, oppositely disposed pivot pins projecting from the side faces of said jaws and resting in the grooves formed in said body portion, a sleeve having an internal annular recess formed therein slidably mounted on said body portion, a yoke connected to said sleeve, and links connecting the ends of said yoke to said annulus.

4. A coupling comprising in combination a cylindrical body member having a bore and counter bore and a plurality of elongated recesses formed in its side wall communicating with openings extending inwardly from its front face, a jaw pivotally mounted intermediate of its ends in each of said recesses, each jaw having teeth formed on its inner face disposed within the openings formed in the body portion and a cam portion on its opposite end, a sleeve having an internal recess formed therein slidably mounted on said body portion, a gasket mounted in the counter bore formed in said body portion, an annulus mounted on said body portion adapted to guide a male coupling member into engagement with said gasket, and means for actuating said sleeve whereby said jaws may be moved into or out of engagement with the male coupling member, said jaws being moved into engagement with said male member through engagement of the internal face of said sleeve with the outer faces of said jaws during forward movement of the sleeve and opened through engagement of the forward edge of the recess in said sleeve with the cam portions of the jaws during rearward movement of the sleeve.

5. A coupling member comprising a tubular body member having a plurality of radially disposed elongated recesses formed in one of its ends, a jaw pivotally mounted intermediate its ends in each recess, each jaw having screw threads formed on its inner face adjacent one end and a cam portion on its opposite end, a sleeve member for actuating said jaws slidably mounted on said body member, and means for sliding said sleeve member on said body member to actuate said jaws into or out of engagement with an externally threaded complemental coupling member.

6. A coupling of the character described comprising in combination a tubular body member, a male coupling member, said body member having a plurality of radially disposed elongated recesses formed in one of its ends, a jaw pivotally mounted in each of said recesses, each jaw having teeth formed on its inner face adjacent one end thereof and a cam portion on its opposite end, a gasket mounted in said body member, an annulus mounted on said body member for guiding the male coupling member into engagement with said gasket, a sleeve disposed on said body member and slidable longitudinally thereon and provided with an internal annular recess for receiving the cam portions of said jaws, and means for actuating said sleeve whereby the teeth on said jaws will engage teeth formed on said male coupling member and draw the end face thereof into fluid tight engagement with said gasket.

7. A coupling comprising a body member, having a plurality of radially disposed recesses formed in its outer end, a locking jaw pivotally mounted in each recess, each jaw having a tooth formed on one end and a cam portion on its opposite end, and a sleeve member for actuating the jaws, said sleeve member being mounted to slide in a longitudinal direction on said body member, whereby said jaws may be moved into and out of engagement with the complemental coupling member.

8. A coupling comprising in combination a body member, a complemental coupling member, said body member having a plurality of radially disposed elongated recesses formed in one of its ends, a toothed locking jaw pivotally mounted in each of said recesses, each of said jaws having a cam portion on one end thereof, and a sleeve disposed on said body member and slidable longitudinally thereon, said sleeve being recessed internally to receive the cam portions of said jaws, whereby the jaws may be brought into and out of engagement with a groove formed in said complemental member.

In testimony whereof I affix my signature.

THOMAS M. RAGAN.